(12) United States Patent
Schroers et al.

(10) Patent No.: US 10,623,709 B2
(45) Date of Patent: Apr. 14, 2020

(54) VIDEO COLOR PROPAGATION

(71) Applicants: Disney Enterprises, Inc., Burbank, CA (US); ETH Zurich, Zurich (CH)

(72) Inventors: Christopher Schroers, Zurich (CH); Simone Meyer, Zurich (CH); Victor Cornillere, Zurich (CH); Markus Gross, Zurich (CH); Abdelaziz Djelouah, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 48 days.

(21) Appl. No.: 16/119,792

(22) Filed: Aug. 31, 2018

(65) Prior Publication Data

US 2020/0077065 A1    Mar. 5, 2020

(51) Int. Cl.
*G06T 7/90* (2017.01)
*H04N 9/43* (2006.01)

(52) U.S. Cl.
CPC ............... *H04N 9/43* (2013.01); *G06T 7/90* (2017.01); *G06T 2207/10016* (2013.01); *G06T 2207/20081* (2013.01); *G06T 2207/20084* (2013.01)

(58) Field of Classification Search
CPC ... H04N 9/43; G06T 7/90; G06T 2207/20081; G06T 2207/10016; G06T 2207/20084
USPC .......................................................... 348/32
See application file for complete search history.

(56) References Cited

U.S. PATENT DOCUMENTS

| | | | |
|---|---|---|---|
| 9,129,227 B1 * | 9/2015 | Yee | G06F 16/335 |
| 9,552,555 B1 * | 1/2017 | Yee | G06F 16/335 |
| 9,996,913 B2 * | 6/2018 | Beck | G06T 5/50 |
| 10,055,493 B2 * | 8/2018 | Heitz, III | G06F 16/639 |
| 2002/0097799 A1 * | 7/2002 | Provitola | H04N 19/503 375/240.12 |
| 2004/0240561 A1 * | 12/2004 | Crinon | H04N 21/23412 375/240.26 |
| 2006/0245645 A1 * | 11/2006 | Yatziv | G06T 11/001 382/167 |

(Continued)

OTHER PUBLICATIONS

Wu et al, A compreshensive study on cross view gait based human identification with deep CNNs (Year: 2017).*

(Continued)

*Primary Examiner* — Shan E Elahi
(74) *Attorney, Agent, or Firm* — Farjami & Farjami LLP

(57) ABSTRACT

A video processing system includes a computing platform having a hardware processor and a memory storing a software code including a convolutional neural network (CNN). The hardware processor executes the software code to receive video data including a key video frame in color and a video sequence in gray scale, determine a first estimated colorization for each frame of the video sequence except the key video frame based on a colorization of a previous frame, and determine a second estimated colorization for each frame of the video sequence except the key video frame based on the key video frame in color. For each frame of the video sequence except the key video frame, the software code further blends the first estimated colorization with the second estimated colorization using a color fusion stage of the CNN to produce a colorized video sequence corresponding to the video sequence in gray scale.

20 Claims, 4 Drawing Sheets

(56) References Cited

U.S. PATENT DOCUMENTS

| | | | |
|---|---|---|---|
| 2011/0182469 A1* | 7/2011 | Ji | G06K 9/00335 |
| | | | 382/103 |
| 2012/0290621 A1* | 11/2012 | Heitz, III | G06F 16/683 |
| | | | 707/780 |
| 2016/0093034 A1* | 3/2016 | Beck | G06T 5/50 |
| | | | 345/617 |
| 2017/0103343 A1* | 4/2017 | Yee | G06F 16/335 |

OTHER PUBLICATIONS

Varun Jampani, Raghudeep Gadde, and Peter V. Gehler. Video propagation networks. In *The IEEE Conference on Computer Vision and Pattern Recognition (CVPR)*, Jul. 2017.

Yijun Li, Ming-Yu Liu, Xueting Li, Ming-Hsuan Yang, and Jan Kautz. A closed-form solution to photorealistic image stylization, *arXiv preprint arXiv: 1802.06474*, 2018.

Jonathan T Barron and Ben Poole. The fast bilateral solver. In *European Conference on Computer Vision*, pp. 617-632, 2016.

YiChang Shih, Sylvain Paris, Connelly Barnes, William T Freeman, and Frédo-Durand. Style transfer for headshot portraits. 2014.

Chuan Li and Michael Wand. Combining markov random fields and convolutional neural networks for image synthesis. In *Proceedings of the IEEE Conference on Computer Vision and Pattern Recognition*, pp. 2479-2486, 2016.

Simon Niklaus, Long Mai, and Feng Liu. Video frame interpolation via adaptive separable convolution. In *Proceedings of the IEEE Conference on Computer Vision and Pattern Recognition*, pp. 261-270, 2017.

* cited by examiner

VIDEO COLOR PROPAGATION

BACKGROUND

Color propagation has a wide range of applications in video processing. For example, color propagation may be utilized as part of the work flow in filmmaking, where color modification for artistic purposes typically plays an important role. In addition, color propagation may be used in the restoration and colorization of heritage film footage.

Conventional approaches for color propagation often rely on optical flow computation to propagate colors in a video sequence from fully colored video frames. However, estimating the correspondence maps utilized in optical flow approaches to color propagation is computationally expensive and tends to be error prone. Unfortunately, inaccuracies in optical flow can lead to color artifacts which accumulate over time. Consequently, there remains a need in the art for a more efficient video color propagation.

SUMMARY

There are provided systems and methods for performing video color propagation, substantially as shown in and/or described in connection with at least one of the figures, and as set forth more completely in the claims.

DETAILED DESCRIPTION

Figure 1:
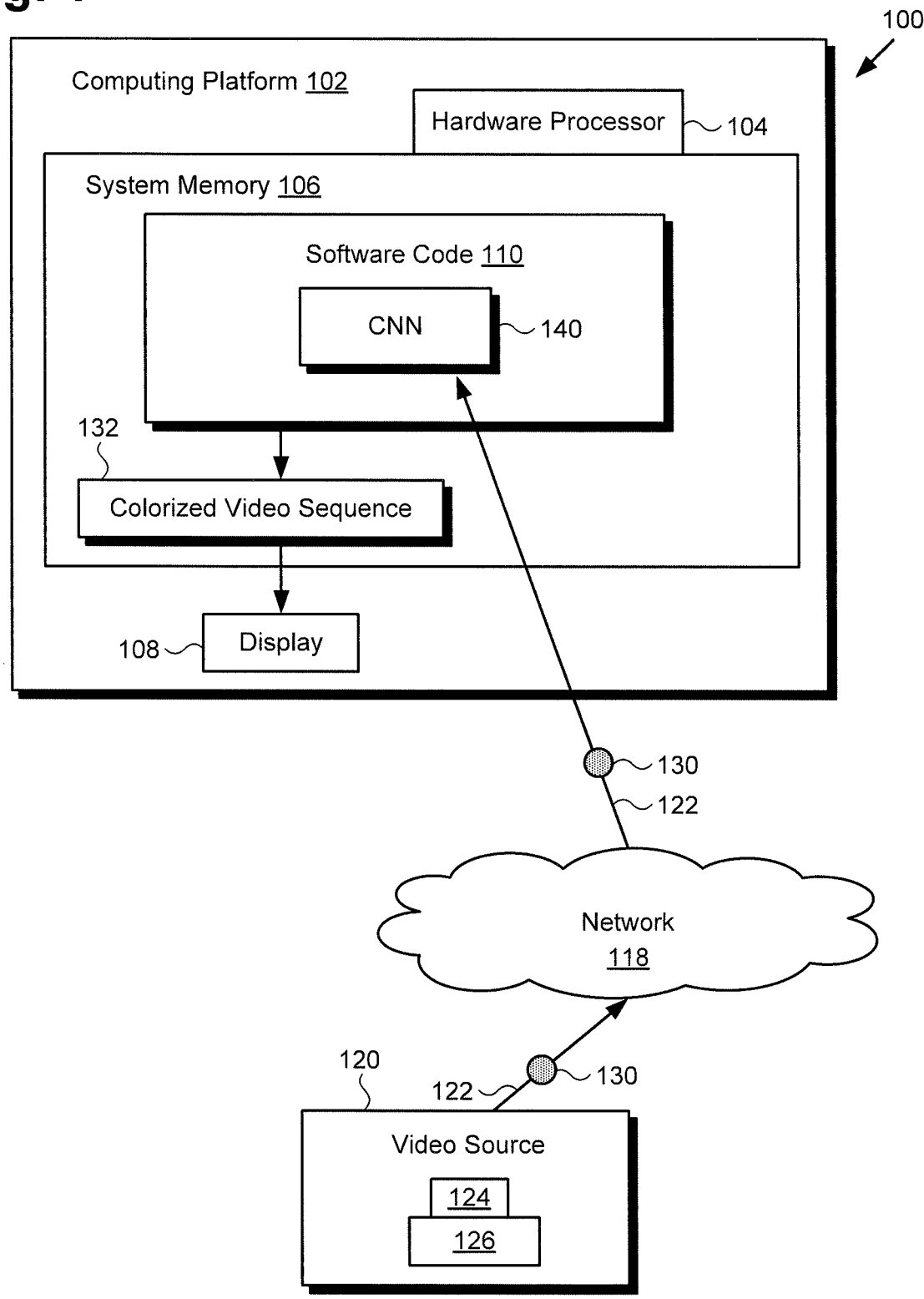
FIG. 1 shows a diagram of an exemplary system for performing video color propagation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a video processing solution suitable for use in performing color propagation in video that overcomes the drawbacks and deficiencies in the conventional art. Moreover, the present video processing solution can be advantageously applied to compress a video.

In one implementation, the present video processing solution utilizes a convolutional neural network (CNN) configured to receive video data including a key video frame in color and a video sequence in gray scale beginning with the key video frame. A local color propagation stage of the CNN architecture can be used to determine an estimated colorization for each frame of the video sequence except the key video frame based on a colorization of a previous neighboring frame of the video sequence. That is to say, the local color propagation stage of the CNN estimates the colorization of the second frame of the video sequence based on the color of the first frame, estimates the colorization of the third frame of the video sequence based on the estimated colorization of the second frame, and so forth.

In addition, in one implementation, a global color transfer stage of the CNN architecture is used to determine an estimated colorization for each frame of the video sequence except the key video frame based on the key video frame in color, i.e., the color values of the key video frame. In one implementation, the colorization estimate generated by the local color propagation stage is blended with the colorization estimate generated separately by the global color transfer stage using a color fusion stage of the CNN architecture. As a result, the systems and methods disclosed in the present application can be advantageously used to produce a colorized video sequence corresponding to the video sequence in gray scale based on the color values of a single key video frame of the video sequence.

It is noted that, as defined in the present application, a CNN is a deep artificial neural network including layers that apply one or more convolution operations to an input to the CNN. Such a CNN is a machine learning engine designed to progressively improve its performance of a specific task.

FIG. 1 shows a diagram of an exemplary system for performing video color propagation, according to one implementation. As shown in FIG. 1, video processing system 100 includes computing platform 102 having hardware processor 104, system memory 106 implemented as a non-transitory storage device, and display 108. According to the present exemplary implementation, system memory 106 stores software code 110, which is shown to include CNN 140.

As further shown in FIG. 1, video processing system 100 is implemented within a use environment including communication network 118 and video source 120 including hardware processor 124 and memory 126. Also shown in FIG. 1 are network communication links 122, video data 130 received by video processing system 100 from video source 120 via communication network 118, and colorized video sequence 132 produced by software code 110 using CNN 140.

It is noted that, although the present application refers to software code 110 as being stored in system memory 106 for conceptual clarity, more generally, software code 110 may be stored on any computer-readable non-transitory storage medium. The expression "computer-readable non-transitory storage medium," as used in the present application, refers to any medium, excluding a carrier wave or other transitory signal, capable of providing instructions to a hardware processor, such as hardware processor 104 of computing platform 102 or hardware processor 124 of video source 120, for example. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110 as being stored in its entirety in system memory 106, that representation is also provided merely as an aid to conceptual clarity. More generally, video processing system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within video processing system 100.

According to the implementation shown by FIG. 1, video processing system 100 receives video data 130 from video source 120 via communication network 118 and network communication links 122. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of limited distribution network.

Video source 120 may be any suitable mobile or stationary computing device or system that implements data processing capabilities sufficient to support connections to communication network 118, and implement the functionality ascribed to video source 120 herein. In some implementations, for example, video source may be an encoder providing compressed video to video processing system 100 in the form of video data 130. As is described in greater detail below, video data 130 may include a key video frame in color and a video sequence in gray scale beginning with the key video frame. Moreover, in one such implementation, computing platform 102 of video processing system 100 may function as a video decoder for decompressing and colorizing video received from video source 120 to produce colorized video sequence 132 by applying the compression process or steps in reverse.

Figure 2:
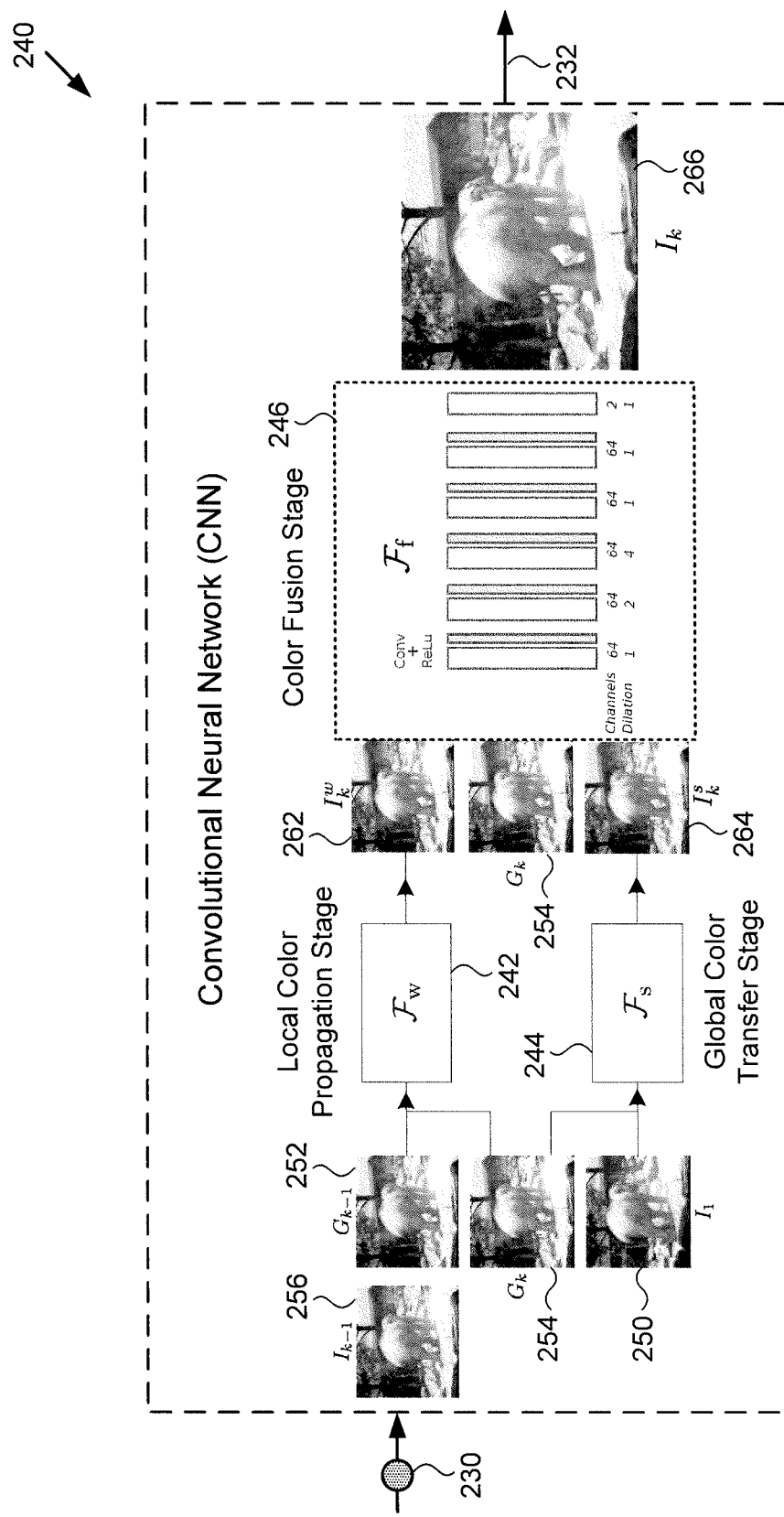
FIG. 2 shows an exemplary convolutional neural network (CNN) included in a software code utilized by the system shown in FIG. 1, according to one implementation.

FIG. 2 shows exemplary CNN 240 suitable for inclusion in software code 110, in FIG. 1, according to one implementation. In addition, FIG. 2 shows video data 230 received as an input to CNN 240 and colorized video sequence 232 provided as an output by CNN 140/240. Video data 230, CNN 240, and colorized video sequence 232 correspond respectively in general to video data 130, CNN 140, and colorized video sequence 132, in FIG. 1. That is to say, video data 230, CNN 240, and colorized video sequence 232 may share any of the characteristics attributed to respective video data 130, CNN 140, and colorized video sequence 132 by the present disclosure, and vice versa.

As shown in FIG. 2, CNN 140/240 includes local color propagation stage 242, global color transfer stage 244, and color fusion stage. According to the exemplary implementation shown in FIG. 2, CNN 140/240 receives video data 130/230 including key video frame 250 in color ($I_1$) as well as a video sequence in gray scale including consecutive gray scale frames 252 ($G_{k-1}$) and 254 ($G_k$), and produces colorized video sequence 132/232 including exemplary colorized video frame 266 ($I_k$). In addition, FIG. 2 shows first estimated colorization 262 (in for gray scale frame 254 ($G_k$) determined using local color propagation stage 242, and second estimated colorization 264 ($I_k^s$) for gray scale frame 254 determined using global color transfer stage 244. Also shown in FIG. 2 is colored frame 256 ($I_{k-1}$), which is a colorized version of previous neighboring frame 252 ($G_{k-1}$) to frame 254 ($G_k$) undergoing colorization.

As further shown in FIG. 2, color fusion stage 246 receives first and second estimated colorizations 262 and 264 of gray scale video frame 254 as inputs, and blends those estimated colorizations to produce colorized video frame 266 corresponding to gray scale video frame 254. Substantially the same process is followed for each frame of the video sequence except key video frame 250, resulting in colorized video sequence 132/232 corresponding to the video sequence in gray scale included in video data 130/230 and represented in FIG. 2 by exemplary consecutive gray scale video frames 252 and 254.

Thus, given a video sequence in grayscale $\mathcal{G} = \{G_1, G_2, \ldots, G_n\}$ of n video frames, where the colored image $I_1$ corresponding to $G_1$ is available, CNN 140/240 colorizes the video sequence $\mathcal{G}$ based on $I_1$. According to one implementation, local color propagation stage 242 of CNN 140/240 employs a local (frame-by-frame) strategy to sequentially propagate colors from $I_1$ to the entire video sequence $\mathcal{G}$ using temporal consistency. Global color transfer stage 244 of CNN 140/240 may operate in parallel with local color propagation stage 242 and employs a global strategy to transfer colors from $I_1$ to all video frames in $\mathcal{G}$ concurrently using a style transfer approach. Color fusion stage 246 of CNN 140/240 then blends the estimated colorizations, e.g., 262 and 264, determined by respective local color propagation stage 242 and global color transfer stage 244 to produce colorized video sequence 132/232 corresponding to video sequence $\mathcal{G} = \{G_1, G_2, \ldots, G_n\}$ in gray scale included in video data 130/230.

Alternatively, given a video sequence in grayscale $\mathcal{G} = \{G_1, G_2, \ldots, G_n\}$ of n video frames, where the colored images $I_1$ and $I_n$ corresponding respectively to $G_1$ and $G_n$ are available, CNN 140/240 may colorize the video sequence $\mathcal{G}$ upward from $G_1$ based on $I_1$ and downward from $G_n$ based on $I_n$ using local color propagation stage 242 and global color transfer stage 244 of CNN 140/240 as described above. According to this alternative approach, local color propagation stage 242 and global color transfer stage 244 each determine two estimated colorizations, one corresponding to color propagation upward from $I_1$ to $G_n$, and a second corresponding to color propagation downward from $I_n$ to $G_1$. Color fusion stage 246 of CNN 140/240 may then blend the four estimated colorizations determined by respective local color propagation stage 242 and global color transfer stage 244 to produce colorized video sequence 132/232 corresponding to video sequence $\mathcal{G} = \{G_1, G_2, \ldots, G_n\}$ in gray scale.

Figure 3:
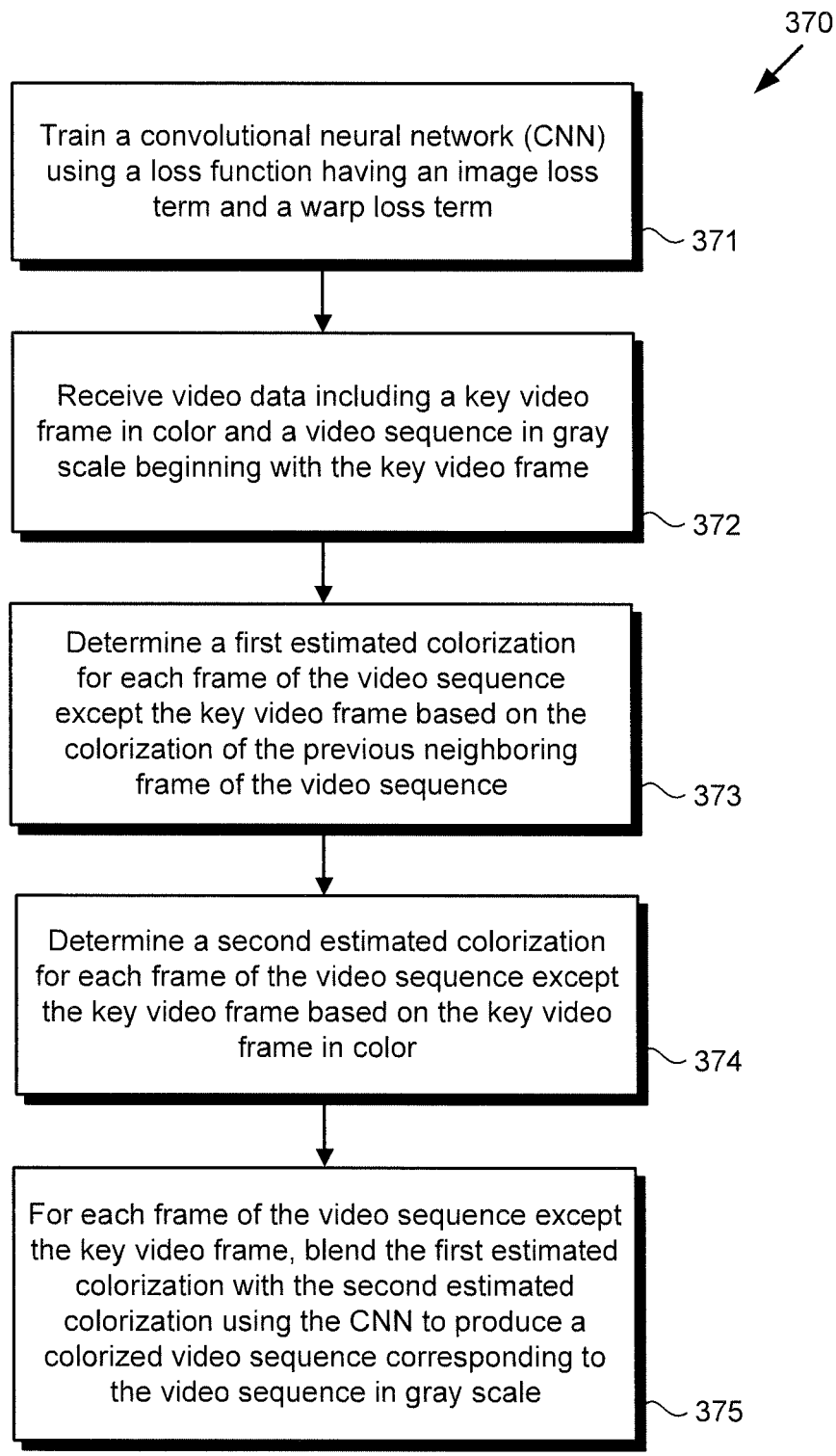
FIG. 3 shows a flowchart presenting an exemplary method for performing video color propagation, according to one implementation.

The functionality of software code 110 and CNN 140/240 will be further described by reference to FIG. 3 in combination with FIGS. 1 and 2. FIG. 3 shows flowchart 370 presenting an exemplary method for performing video color propagation, according to one implementation. With respect to the method outlined in FIG. 3, it is noted that certain details and features have been left out of flowchart 370 in order not to obscure the discussion of the inventive features in the present application.

Referring to FIG. 3 in combination with FIGS. 1 and 2, flowchart 370 begins with training CNN 140/240 using a loss function having an image loss term and a warp loss term (action 371). CNN 140/240 is trained to minimize the objective function, or loss function $\mathcal{L}$, (hereinafter "loss function") over a dataset, $\mathcal{D}$, including sequences of colored and gray scale images:

$$\Lambda_f^*, \Lambda_w^* = \underset{A_f, A_w}{\mathrm{argmin}} \, \mathbb{E}_{I_1, I_2, G_1, G_2 \sim \mathcal{D}}[\mathcal{L}] \qquad \text{(Equation 1)}$$

where the loss function $\mathcal{L}$ includes an image loss term and a warp loss term.

For the image loss term, the $\ell_1$-norm of pixel differences is used to express the image loss as the difference between the true image I (hereinafter referred to as "ground truth image") and the colorized image $\hat{I}$ as:

$$\mathcal{L}_1 = \|I - \hat{I}\|_1 \quad \text{(Equation 2)}$$

Regarding the warp loss term, it is noted that local color propagation stage 242 of CNN 140/240 predicts the kernels used to warp the color frame $I_{i-1}$. That functionality may be enforced by a warp loss term computed using the $\ell_1$-norm of pixel differences between the ground truth image and first estimated colorization 262 ($I_k^w$) of gray scale frame 254 ($G_k$) determined by local color propagation stage 242 as:

$$\mathcal{L}_w = \|I_k - I_k^w\|_1 \quad \text{(Equation 3)}$$

Thus, local color propagation stage 242 of CNN 140/240 is trained using a warp loss function.

It is noted that, because first estimated colorization 262 ($I_k^w$) of gray scale frame 254 ($G_k$) is an intermediate result, using more sophisticated loss functions such as feature loss or adversarial loss is not necessary. Sharp details can be expected to be recovered by color fusion stage 246 of CNN 140/240.

To efficiently train CNN 140/240, local color propagation stage 242 and global color transfer stage 244 are applied separately to all training video sequences in a first training phase. The resulting estimated colorizations 262 and 264 ($I_k^w$ and $I_k^s$) reveal the limitations of the generating functions $\mathcal{F}_w$ and $\mathcal{F}_s$ applied respectively by local color propagation stage 242 and global color transfer stage 244. Color fusion stage 246 may then be trained to synthesize the best color image using estimated colorizations 262 and 264 ($I_k^w$ and $I_k^s$) as inputs in a second training phase.

Gray scale frame 254 ($G_k$) and the intermediate estimated colorizations 262 and 264 ($I_k^w$ and $I_k^s$) may be provided in YUV-color space. Using the luminance channel helps the prediction process as it can be seen as an indicator of the accuracy of the intermediate results. The final stage includes the chrominance values estimated by color fusion stage 246 and $G_k$ as a luminance channel.

Referring once again to FIG. 3 in combination with FIGS. 1 and 2, flowchart 370 continues with receiving video data 130/230 including key video frame 250 in color and the video sequence beginning with key video frame 250 and including consecutive gray scale frames 252 ($G_{k-1}$) and 254 ($G_k$) (action 372). As shown by FIG. 1, in one implementation, video data 130/230 may be received by video processing system 100 from video source 120, which may be a video encoder for example, via communication network 118 and network communication links 122. Video data 130/230 including key video frame 250 in color and the video sequence in gray scale may be received by CNN 140/240 of software code 110, executed by hardware processor 104.

Flowchart 370 continues with determining first estimated colorization 262 for each frame of the video sequence except key video frame 250 based on the colorization of the previous neighboring frame of the video sequence (action 373). The determination of first estimated colorization 262 for each frame of the video sequence except key video frame 250 based on the colorization of the previous neighboring frame of the video sequence may be performed by CNN 140/240 of software code 110, executed by hardware processor 104, and using local color propagation stage 242 as described below.

Relying on temporal consistency, the objective of action 373 is to propagate colors frame-by-frame. Using an adaptive convolution approach, color propagation can be described in terms of a convolution operation performed on a color image. That is to say, given two consecutive gray scale frames 252 ($G_{k-1}$) and 254 ($G_k$), and the colored frame 256 ($I_{k-1}$) corresponding to gray scale frame 252, an estimate 262 of the colorized version $I_k$ corresponding to gray scale frame 254 can be expressed as:

$$I_k^w(x,y) = P_{k-1}(x,y) * K_K(x,y) \quad \text{(Equation 4)}$$

where $P_{k-1}(x,y)$ is the image patch around pixel $I_{k-1}(x,y)$, and $K_K(x,y)$ is the estimated pixel dependent convolution kernel based on $G_k$ and $G_{k-1}$. The kernel $K_K(x, y)$ may be approximated with two one-dimensional (1D) kernels as:

$$K_k(x,y) = K_k^v(x,y) * K_k^h(x,y) \quad \text{(Equation 5)}$$

Recalling that the generating function for local color propagation stage 242 is denoted as $\mathcal{F}_w$, first estimated colorization 262 determined by local color propagation stage 242 can be written as:

$$I_k^w = \mathcal{F}_w(G_k, G_{k-1}, I_{k-1}; \Lambda_w) \quad \text{(Equation 6)}$$

where $\Lambda_w$ is the set of trainable parameters used in local color propagation stage 242.

In one implementation, the architecture of local color propagation stage 242 includes an encoder part that has five convolutional blocks where feature tensors are progressively halved spatially. After the bottleneck, the first decoder blocks are shared, then a branch is created for each orientation of the 1D kernels. Each block may include three Conv-Relu pairs. Down-sampling can be done through an average-pooling layer whereas up-sampling can be estimated with bilinear interpolation. It is noted that, according to the present exemplary implementation, only two kernels are predicted. In addition, a softmax layer is used before kernel prediction.

Flowchart 370 continues with determining second estimated colorization 264 for each frame of the video sequence except key video frame 250 based on key video frame 250 in color (action 374). The determination of second estimated colorization 264 for each frame of the video sequence except key video frame 250 based on key video frame 250 in color may be performed by CNN 140/240 of software code 110, executed by hardware processor 104, and using global color transfer stage 244 as described below.

The local color propagation implemented by local color propagation stage 242 of CNN 140/240 typically becomes less reliable as frame 254 undergoing colorization is farther away from key video frame 250. This can be due to occlusions/dis-occlusions, new elements appearing in the scene or even complete change of background (due to camera panning for example). In that case, a global strategy with semantic understanding of the scene is advantageous. Such a global strategy enables transfer of color within a longer range both temporally and spatially. To achieve that result, deep features extracted from the video frames are processed by global color transfer stage 244 trained for classification and image segmentation.

Figure 4:
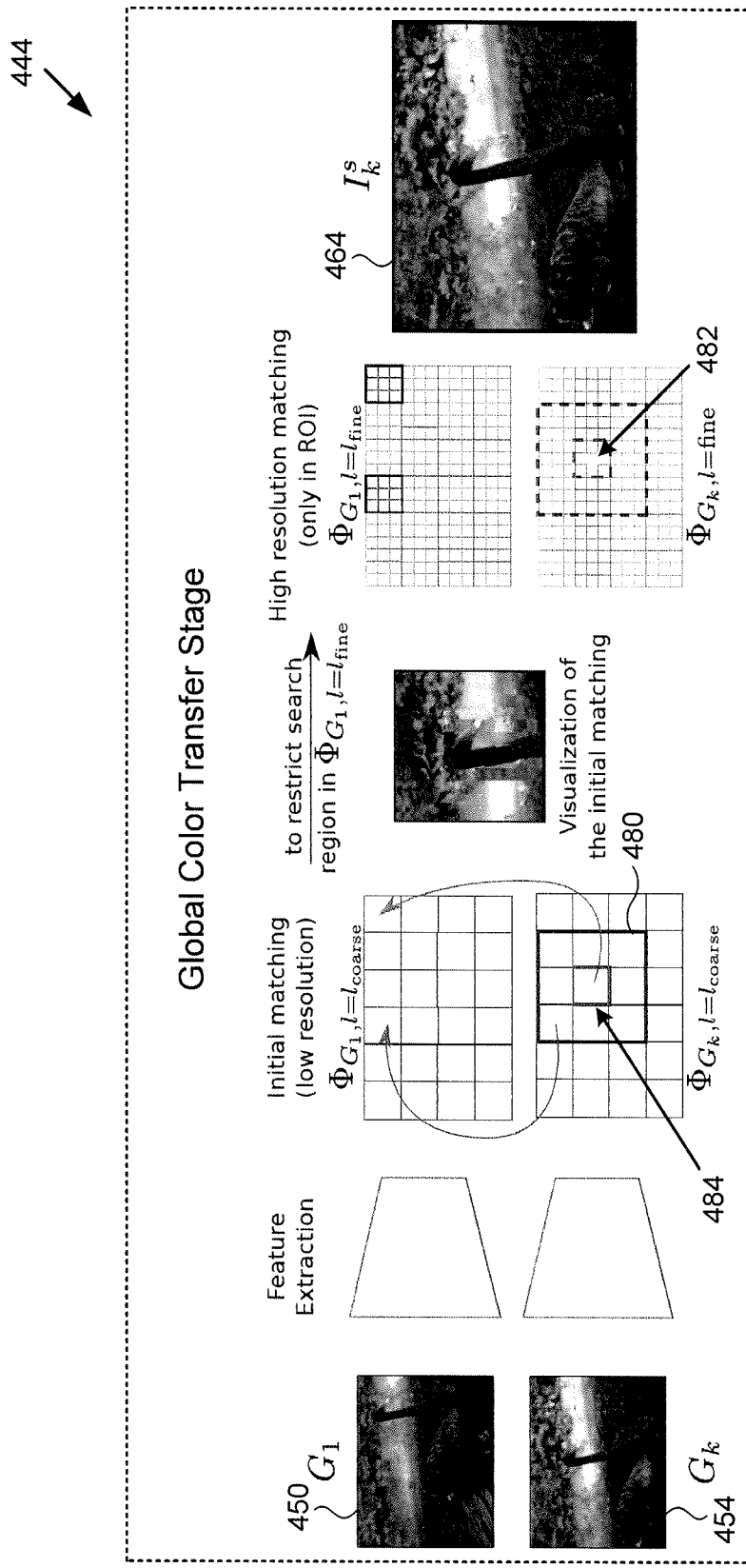
FIG. 4 shows a diagram of an exemplary process flow performed by a global color transfer stage of the CNN shown in FIG. 2, according to one implementation.

Referring to FIG. 4, FIG. 4 shows a diagram of an exemplary process flow performed by global color transfer stage 444, according to one implementation. As shown in FIG. 4, global color transfer stage 444 utilizes gray scale reference frame 450 ($G_1$) corresponding to key video frame 250 ($I_1$), the color values of key video frame 250 ($I_1$), and gray scale frame 454 ($G_k$) to determine second estimated colorization 464 ($I_k^s$) for gray scale frame 454.

It is noted that global color transfer stage 444, gray scale frame 454, and second estimated colorization 464 for gray scale frame 454 correspond respectively in general to global color transfer stage 244, gray scale frame 254, and second estimated colorization 264, in FIG. 2. Thus, global color transfer stage 444, gray scale frame 454, and second estimated colorization 464 may share any of the characteristics attributed to respective global color transfer stage 244, gray scale frame 254, and second estimated colorization 264 by the present disclosure, and vice versa.

To transfer the colors of key video frame 250 ($I_1$) to gray scale frame 254/454 ($G_k$), feature maps $\Phi_{G_1}$ and $\Phi_{G_k}$ are extracted from both inputs $G_1$ and $G_k$. First, a matching is estimated at low resolution. Such a matching may be performed on features from a deep layer ($l_{coarse}$) in order to consider more abstract information. Such a low resolution matching is too coarse to directly copy corresponding image patches, however. Instead, the initial matching is used to restrict the search region when matching pixels using low level image statistics (from level $1_{fine}$ feature map). The region of interest 480 shown in blue is used to match pixel 482 in light green. All the pixels sharing the same coarse positions, i.e., those included in dark green rectangle 484, share the same region of interests. Using the final feature matching, colors from key video frame 250 in color are transferred to gray scale image 254/454.

Formally, the feature map extracted from the image $I_1$ at layer l of global color transfer stage 244/224 implemented as a discriminatively trained deep convolutional neural network is denoted as $\Phi_{I_1,l}$. A pixel-wise matching between gray scale reference frame 450 ($G_1$) and the current frame to colorize 254/454 ($G_k$) can be estimated using their respective feature maps $\Phi_{G_1,l}$ and $\Phi_{G_k,l}$. Similarity for two positions x and x' can be measured as:

$$S_{G_k,G_1}(x, x') = \|\Phi_{G_k,l}(x) - \Phi_{I_1,l}(x')\|_2^2 \quad \text{(Equation 7)}$$

Transferring the colors using pixel descriptor matching can be written as:

$$I_k^s(x) = I_1(\arg_x \min S_{G_k,G_1}(x,x')) \quad \text{(Equation 8)}$$

To maintain good quality for the matching, while also being computationally efficient, a two stage coarse-to-fine matching may be adopted. Matching is first estimated for feature level $l=l_{coarse}$. This first matching, at lower resolution, defines a region of interest for each pixel in the second matching step at level $l=l_{fine}$. The different levels l of the feature maps correspond to different abstraction levels. The coarse level matching allows regions that have similar semantics to be considered, whereas the fine matching step considers texture-like statistics that are more effective once a region of interest has been identified. Recalling that the generating function for global color transfer stage 244/444 is denoted as $\mathcal{F}_s$, second estimated colorization 264/464 determined by global color transfer stage 244/444 can be written as:

$$I_k^s = \mathcal{F}_s(G_k, I_1, G_1; \Lambda_s) \quad \text{(Equation 9)}$$

where $\Lambda_s$ is the set of trainable parameters used in global color transfer stage 244/444.

Thus, according to the exemplary implementation shown by FIGS. 2 and 4, second estimated colorization 264/464 for each frame of the video sequence except key video frame 250 may be determined based on key video frame 250 in color using global color transfer stage 244/444 of CNN 140/240. Moreover, second estimated colorization 264/464 for each frame of the video sequence except key video frame 250 may be determined using global color transfer stage 244/444 based on a comparison of a feature map of each frame with a feature map of key video frame in gray scale.

It is noted that, in some implementations, actions 373 and 374 may be performed independently and concurrently by respective local color propagation stage 242 and global color transfer stage 244/444 of CNN 140/240. That is to say, in those implementations, first estimated colorization 262 for each frame of the video sequence except key video frame 250 and second estimated colorization 264/464 for each frame of the video sequence except key video frame 250 may be determined in parallel by respective local color propagation stage 242 and global color transfer stage 244/444.

Flowchart 370 can conclude with, for each frame of the video sequence, blending first estimated colorization 262 for the frame with second estimated colorization 264/464 for the frame using color fusion stage 246 of CNN 140/240 to produce colorized video sequence 132/232 corresponding to the video sequence in gray scale included in video data 130/230 (action 375). As noted, action 375 may be performed by CNN 140/240 of software code 110, executed by hardware processor 104, and using color fusion stage 246.

The first and second estimated colorizations 262 and 264/464 obtained from respective local color propagation stage 242 and global color transfer stage 244/444 of CNN 140/240 are complementary. First estimated colorization 262 provided by local color propagation stage 242 is typically sharp with most of the fine details preserved. Colors are mostly well estimated except at occlusion/dis-occlusion boundaries where some color bleeding can be noticed. Second estimated colorization 264/464 provided by global color transfer stage 244/444 may be very coarse, but colors can be propagated to a much longer range both temporally and spatially.

Blending first estimated colorization 262 ($I_k^w$) for a particular gray scale frame 254/454 ($G_k$) with the second estimated colorization 264/464 ($I_k^s$) for the same frame results in colorized video frame 266 ($I_k$) corresponding to gray scale frame 254/454 ($G_k$). Recalling that the generating function for color fusion stage 246 of CNN 140/240 is denoted as $\mathcal{F}_f$, colorized video frame ($I_k$) can be expressed as:

$$I_k = \mathcal{F}_f(G_k, I_k^w, I_k^s; \Lambda_f) \quad \text{(Equation 10)}$$

where $\Lambda_f$ is the set of trainable parameters used in color fusion stage 246.

It is noted that, although not included in flowchart 370, in some implementations, the present method can include rendering colorized video sequence 132/232, on a display, such as display 108 of video processing system 100. It is noted that display 108 may be implemented as a liquid crystal display (LCD), a light-emitting diode (LED) display, an organic light-emitting diode (OLED) display, or another suitable display screen that performs a physical transformation of signals to light. The rendering of colorized video sequence 132/232 on display 108 may be performed by software code 110, executed by hardware processor 104 of computing platform 102.

It is further noted that, in some implementations, video processing system 100 may include video source 120 in addition to computing platform 102. In some of those implementations, video source 120 may take the form of a video encoder configured to transmit compressed video as part of video data 130/230. For example, video source 120 may utilize hardware processor 124 and memory 126 to compress a video sequence, generate video data 130/230 including key video frame 250 in color and the compressed video sequence in gray scale, and transmit video data 130/230 to computing platform 102 implemented as a decoder configured to decompress and propagate color through the video sequence.

In addition, in some implementations, video source 120 may also be configured to select key video frame 250 for propagating color through the video sequence. Moreover, in some implementations, video source 120 may be configured to transmit residual color information for portions of the video sequence included in video data 130/230 for which color propagation may not be perfectly accurate. In those latter implementations, the residual color information may be used by software code 110, executed by hardware processor 104, to correct or augment the colorization to the video sequence included in video data 130/230.

Thus, the present application discloses a video processing solution suitable for use in performing color propagation with applications to video compression. The present solution utilizes a CNN configured to determine a first, local, estimated colorization for each frame of a video sequence received in gray scale, frame-by-frame. In addition, the CNN is configured to determine a second, global, estimated colorization for each frame of the video sequence based on color values of a key video frame with which the video sequence begins. The CNN is further configured to blend the first and second estimated colorizations for each respective frame of the video sequence to produce a colorized video sequence corresponding to the video sequence received in gray scale. The present video processing solution advantageously produces better colorization results over longer video sequences than existing state-of-the-art methods for video color propagation.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
a computing platform including a hardware processor and a system memory storing a software code including a convolutional neural network (CNN);
the hardware processor configured to execute the software code to:
receive a video data including a key video frame in color and a video sequence in gray scale beginning with the key video frame;
determine a first estimated colorization for each frame of the video sequence except the key video frame based on a colorization of a previous neighboring frame of the video sequence;
determine a second estimated colorization for each frame of the video sequence except the key video frame based on the key video frame in color; and
for each frame of the video sequence except the key video frame, blend the first estimated colorization for the each frame with the second estimated colorization for the each frame using a color fusion stage of the CNN to produce a colorized video sequence corresponding to the video sequence in gray scale.

2. The video processing system of claim 1, wherein the hardware processor is further configured to execute the software code to render the colorized video sequence on a display.

3. The video processing system of claim 1, wherein the first estimated colorization for each frame of the video sequence except the key video frame is determined based on the colorization of the previous neighboring frame of the video sequence using a local color propagation stage of the CNN.

4. The video processing system of claim 3, wherein the local color propagation stage of the CNN is trained using a warp loss function.

5. The video processing system of claim 3, wherein the second estimated colorization for each frame of the video sequence except the key video frame is determined based on the key video frame in color using a global color transfer stage of the CNN.

6. The video processing system of claim 5, wherein the second estimated colorization for each frame of the video sequence except the key video frame is determined using the global color transfer stage of the CNN further based on a comparison of a feature map of the each frame with a feature map of the key video frame in gray scale.

7. The video processing system of claim 5, wherein the first estimated colorization for each frame of the video sequence except the key video frame and the second estimated colorization for each frame of the video sequence except the key video frame are determined in parallel by the respective local color propagation stage and the global color transfer stage of the CNN.

8. The video processing system of claim 1, wherein the CNN is trained using a loss function including an image loss term and a warp loss term.

9. A method for use by a video processing system including a computing platform having a hardware processor and a system memory storing a software code including a convolutional neural network (CNN), the method comprising:
receiving, using the hardware processor, a video data including a key video frame in color and a video sequence in gray scale beginning with the key video frame;
determining, using the hardware processor, a first estimated colorization for each frame of the video sequence except the key video frame based on a colorization of a previous neighboring frame of the video sequence;
determining, using the hardware processor, a second estimated colorization for each frame of the video sequence except the key video frame based on the key video frame in color; and
for each frame of the video sequence except the key video frame, blend the first estimated colorization for the each frame with the second estimated colorization for the each frame, using the hardware processor and a color fusion stage of the CNN, to produce a colorized video sequence corresponding to the video sequence in gray scale.

10. The method of claim 9, further comprising rendering, using the hardware processor, the colorized video sequence on a display.

11. The method of claim 9, wherein determining the first estimated colorization for each frame of the video sequence except the key video frame based on the colorization of the previous neighboring frame of the video sequence is performed using a local color propagation stage of the CNN.

12. The method of claim 11, wherein the local color propagation stage of the CNN is trained using a warp loss function.

13. The method of claim 11, wherein determining the second estimated colorization for each frame of the video sequence except the key video frame based on the key video frame in color is performed using a global color transfer stage of the CNN.

14. The method of claim 13, wherein determining the second estimated colorization for each frame of the video sequence except the key video frame using the global color transfer stage of the CNN is further based on a comparison of a feature map of the each frame with a feature map of the key video frame in gray scale.

15. The method of claim 13, wherein determining the first estimated colorization for each frame of the video sequence except the key video frame and determining the second estimated colorization for each frame of the video sequence except the key video frame are performed in parallel by the respective local color propagation stage and the global color transfer stage of the CNN.

16. The method of claim 9, wherein the CNN is trained using a loss function including an image loss term and a warp loss term.

17. A video compression method for use by a computing platform having a hardware processor, the method comprising:
receiving, using the hardware processor, a video data including a key video frame in color and a video sequence in gray scale beginning with the key video frame;
determining, using the hardware processor, a first estimated colorization for each frame of the video sequence except the key video frame based on a colorization of a previous neighboring frame of the video sequence;
determining, using the hardware processor, a second estimated colorization for each frame of the video sequence except the key video frame based on the key video frame in color; and
for each frame of the video sequence except the key video frame, blend the first estimated colorization for the each frame with the second estimated colorization for the each frame, using the hardware processor and a color fusion stage of a convolutional neural network (CNN), to produce a colorized video sequence corresponding to the video sequence in gray scale.

18. The video compression method of claim 17, wherein determining the first estimated colorization for each frame of the video sequence except the key video frame based on the colorization of the previous neighboring frame of the video sequence is performed using a local color propagation stage of the CNN.

19. The video compression method of claim 18, wherein the local color propagation stage of the CNN is trained using a warp loss function.

20. The video compression method of claim 18, wherein determining the second estimated colorization for each frame of the video sequence except the key video frame based on the key video frame in color is performed using a global color transfer stage of the CNN.

* * * * *